R. W. ASHLEY & F. OBERKIRCH.
DEMOUNTABLE RIM.
APPLICATION FILED FEB. 19, 1912.
1,082,299.
Patented Dec. 23, 1913.
2 SHEETS—SHEET 1.
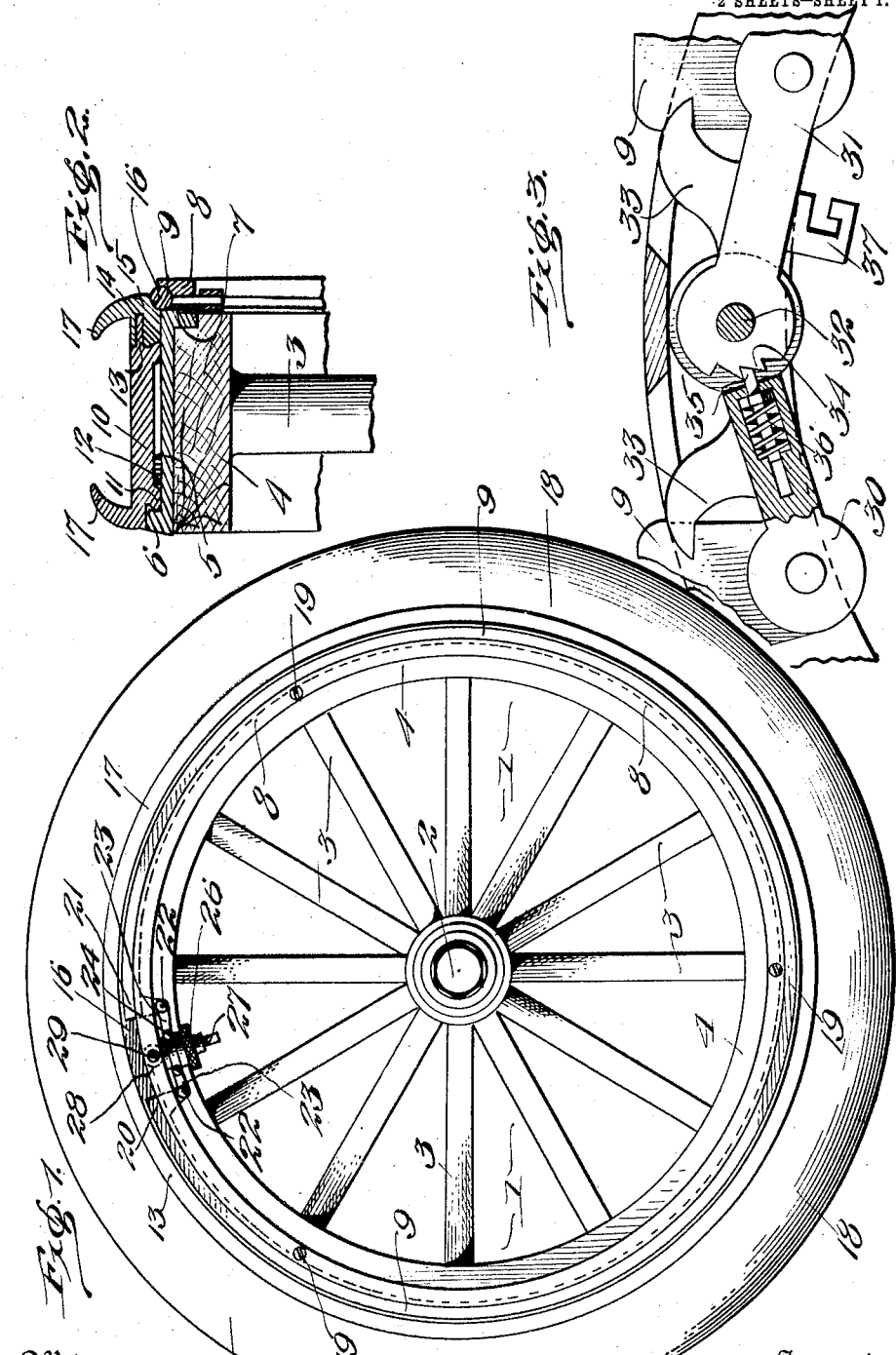

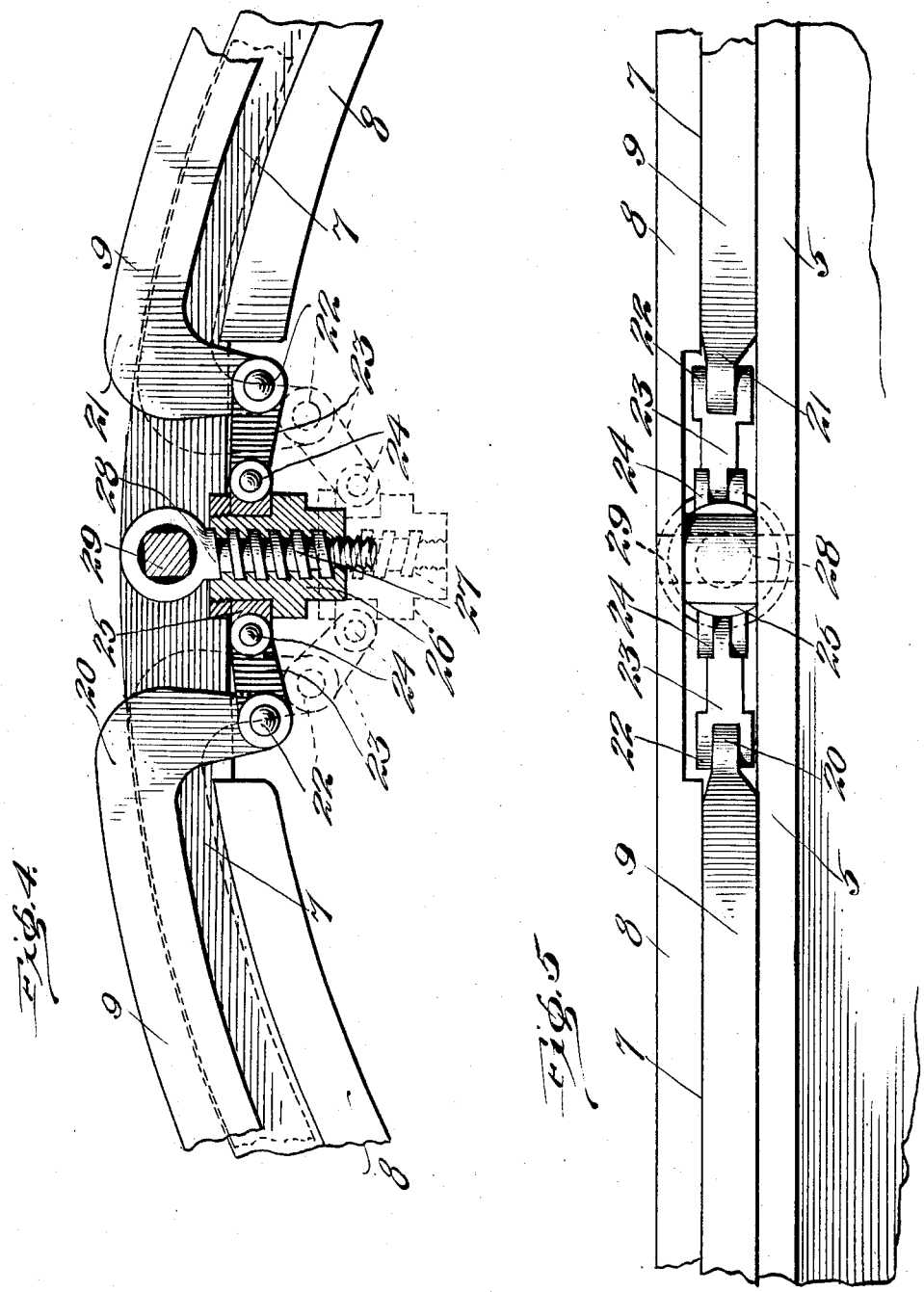

UNITED STATES PATENT OFFICE.

ROBERT W. ASHLEY AND FRANK OBERKIRCH, OF NEW YORK, N. Y.

DEMOUNTABLE RIM.

1,082,299.  Specification of Letters Patent.  Patented Dec. 23, 1913.

Application filed February 19, 1912. Serial No. 678,633.

*To all whom it may concern:*

Be it known that we, ROBERT W. ASHLEY and FRANK OBERKIRCH, citizens of the United States, and residents of New York city, in the county of New York and State of New York, have invented certain new and useful Improvements in Demountable Rims, of which the following is a specification.

The invention relates to improvements in locking apparatus for demountable rims for vehicle wheels and has particular reference to a device associated with the rim structure for maintaining an equal holding pressure on the movable parts of said rim.

The object of the invention is the providing of a locking means comprising a floating ring, housed in the supporting structure of a wheel rim and free to move around the greater part of said rim, yet having its two free ends rigidly and pivotally mounted to the rim body.

Another object of the invention is the providing of a locking means for said floating ring that will protect and securely lock and hold the same against excessive expansion and contraction.

In the following is described in connection with the accompanying drawings one embodiment of the invention the features thereof being more particularly pointed out hereinafter in the claims.

In the drawings,—Figure 1 is a side elevation of a vehicle wheel showing in connection therewith the adaptation thereto of the floating ring and its locking means; Fig. 2 is a cross sectional view of the wheel felly and rim showing the type of demountable rim used; Fig. 3 is a modified type of ring locking means; Fig. 4 is an enlarged detail view of the floating ring, and supporting rim ring illustrating the locking means in vertical section, the unlocked position being shown in dotted lines; Fig. 5 is an upper plan view of the structure shown in Fig. 4.

Similar numerals of reference indicate similar parts throughout the several views.

In the drawings, 1 indicates a vehicle wheel provided with a hub 2 carrying spokes 3 supporting at their outer ends a felly 4. Felly 4 has rigidly mounted thereon a fixed supporting rim 5 having formed on its rear edge a locking channel 6 and on its front edge a ring reception groove 7.

8 designates a supporting ring fastened to rim 5 and felly 4 by any suitable means which may have formed therein a portion of groove or the inner surface may form the supporting wall for a floating expanding and contracting ring 9 the features of which are hereinafter described. Rim 5 receives the male member 10 of the demountable rim the depending shoulder 11 engaging the locking channel 6 and having cut therein slots engaging holding lugs 12 formed with said rim 5 for the purpose of securely locking the same thereon. Rim member 10 has formed thereon a tongue 13 engaging a reception locking groove 14 in female member 15 which has formed therein an inverted locking groove 16 which receives ring 9 when in its expanded or locked position, members 10 and 13 being provided with clencher shoulders 17 which receive a pneumatic shoe and tube 18. Ring 8 may be rigidly mounted on felly 4 and rim 5 by any means such as by bolts 19.

Matter not specifically shown and described herein but referred to is shown and described in applicants' co-pending application Serial No. 663,622 filed Dec. 2nd, 1911, for demountable rims for vehicle wheels.

Floating ring 9 may be made in any form and is so mounted in groove 7 that it is free around the entire circumference of the wheel, and is provided with free depending ends 20 and 21, having pivotally mounted therein at 22 levers 23, the opposite ends of which are pivotally mounted at 24 in swivel head 25 mounted in following locking head 26 which is provided internally with a worm thread engaging the worm threaded surface 27 on supporting shank or post 28 which is in turn rigidly mounted in ring 8 and supporting rim 5 on stud 29, the outer end of said post 28 being ordinarily threaded to receive a locknut if desired. It will be noted that ring 9 is a floating expansible and contractible member free to move within its reception groove but yet it is a ring rigidly and permanently associated with the demountable separable members of a wheel rim by reason of its rigid supporting locking means. The locking means described provides a means of controlling the position of the floating ring 9 as well as a means of securely locking the same at any point during expansion as well as contraction, also during the locking of the same it provides a centering means for said ring 9. The dotted position shown in Fig. 4 of the drawings is its unlocked position and illustrates the principle of supplying a floating ring that need not be held at any point during the movement of its locking means. The worm feature of the lock provides a means necessitating a very slight movement of the following head 26 in order to lock or unlock ring 9 there being only a full turn or revolution of the same needed with the aid of a ratchet wrench or other suitable tool, or, the head may be knurled, in which case the floating ring may be operated manually.

With reference to Fig. 3 of the drawings, ring 9 is provided with depending ends having pivotally mounted therein levers 30 and 31 which are also pivotally mounted to one another at their respective ends as at 32, each of said levers being provided with locking lugs 33 to insure against excessive expansion and contraction. Lever 31 is provided with a head having cut therein teeth 34 adapted to engage a pawl 35 mounted in lever 30 and controlled by spring 36, the object of which is to provide means for permanently locking the ring 9 in its expanded position, it being necessary to release pawl 35 from teeth 34 before it can be unlocked or the ring 9 contracted. The contracted position of ring 9 is had by means of inserting a tool of any nature in depending lug 37 on lever 31 which permits both of said levers to be moved downwardly and release the expansion on said ring 9.

What we claim and desire to secure by Letters Patent of the United States is:—

1. A device of the character described comprising a fixed rim provided at one edge with an annular groove and at its opposite edge with a retaining shoulder, a floating ring loosely mounted in said groove provided with depending ends, and a locking head having associated therewith a supporting means rigidly mounted in said fixed rim said locking head being provided with links connecting the free ends of said ring adapted to hold said ring in its expanded and contracted positions.

2. A device of the character described including a fixed rim provided with a locking means reception groove and a retaining shoulder, a locking ring capable of expansion and contraction mounted in said groove having free ends projecting through said fixed rim, a supporting threaded stud rigidly mounted in said fixed rim, a locking head movable on said stud, a swivel head carried by said locking head, and links carried by said swivel head connected with the free ends of said ring for controlling the movement of said ring.

3. A device of the character described including a locking retaining means for demountable rims comprising a floating ring mounted in a fixed annular rim adapted for annular expansive and contractive adjustment with relation to said fixed rim and provided with free depending ends, a supporting threaded stud rigidly mounted in said fixed rim, a locking head movable on said stud, a swivel head carried by said locking head, levers carried by said swivel head connected with the depending ends of said ring, said locking head being operative at a single point on the circumference of said rim to actuate said ring to hold the same in its expanded locked and contracted unlocked positions.

In testimony whereof we have hereto signed our names in the presence of two subscribing witnesses.

ROBERT W. ASHLEY.
FRANK OBERKIRCH.

Witnesses:
L. M. BACON,
L. M. TINSLEY.

Copies of this patent may be obtained for five cents each, by addressing the "Commissioner of Patents, Washington, D. C."